(12) United States Patent
Bahrenburg et al.

(10) Patent No.: US 6,381,260 B1
(45) Date of Patent: Apr. 30, 2002

(54) METHOD AND RADIO STATION FOR DATA TRANSMISSION

(75) Inventors: Stefan Bahrenburg, München; Paul Walter Baier, Kaiserslautern; Dieter Emmer, Starnberg; Tobias Weber, Otterbach; Jürgen Mayer; Johannes Schlee, both of Blaustein, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/550,213

(22) Filed: Apr. 17, 2000

Related U.S. Application Data (63) Continuation of application No. PCT/DE98/02996, filed on Oct. 9, 1998.

(30) Foreign Application Priority Data

Oct. 17, 1997 (DE) .......................... 197 46 083

(51) Int. Cl.[7] .......................... H04B 7/212; H04B 7/216
(52) U.S. Cl. .......................... 375/130; 375/140; 370/342
(58) Field of Search .......................... 370/335, 337, 370/442, 441, 438, 342; 375/130, 131, 140, 145, 295, 296

(56) References Cited

U.S. PATENT DOCUMENTS

| | | | | |
|---|---|---|---|---|
| 5,644,576 A | * | 7/1997 | Bauchot et al. | 370/437 |
| 6,078,607 A | * | 6/2000 | Monroe et al. | 375/145 |
| 6,240,100 B1 | * | 5/2001 | Riordan et al. | 370/442 |
| 6,307,851 B1 | * | 10/2001 | Jung et al. | 370/342 |

FOREIGN PATENT DOCUMENTS

| | | | | |
|---|---|---|---|---|
| DE | 195 49 148 A1 | 7/1997 | ............ | H04Q/7/20 |
| DE | 197 33 336 A1 | 2/1999 | ............ | H04J/3/22 |
| DE | 197 46 083 C1 | 3/1999 | ............ | H04J/13/02 |
| EP | 0 678 991 A2 | 10/1995 | ............ | H04J/13/00 |

OTHER PUBLICATIONS

Castedo et al., "Performance Analysis of a CMA–Based Adaptive Multiuser Detector", First IEEE Signal Processing Workshop on Signal Processing Advances in Wireless Communicatios, pp. 281–284, 1997.*

(List continued on next page.)

*Primary Examiner*—Chi Pham
*Assistant Examiner*—Dung X. Nguyen
(74) *Attorney, Agent, or Firm*—Herbert L. Lerner; Laurence A. Greenberg; Werner H. Stemer (57) ABSTRACT

Data is transmitted via a radio interface in a radio communications system in that at least one subscriber signal is transmitted, which has an individual fine structure applied to it and, in addition to data symbols in data sections, contains a midamble with known symbols. The fine structures of the data sections and of the midamble differ. At the transmission end, a sum signal is produced which contains signal sections to which different fine structures are applied. The sum signal is filtered in at least one transmission filter and is transmitted via a transmission channel to a receiving radio station. A control device controls the addition so that different attenuation of the signal sections is compensated for by the filtering. The method is suitable, in particular, for mobile stations having a single or variable data rate, and for base stations for use in 3rd generation TD/CDMA mobile radio networks.

18 Claims, 5 Drawing Sheets

OTHER PUBLICATIONS

Kammerlander et al., "On Multicarrier CDMA Mobile Radio Systems with Joint Detection and Coherent Receiver Antenna Diversity", Fifth IEEE International Conference on Universal Personal Communications, vol. 1, pp. 61–65, 1996.*

Kammerlander , "Benefits of Combined TDMA/CDMA Operation for Third Generation Mobile Radio Systems", Fourth IEEE International Conference on Spread Spectrum Techniques and Applications Proceedings, vol. 2, pp. 507–512, 1996.*

Published International Application No. WO 95/33313 (Heikkinen et al.), dated Dec. 7, 1995.

"A joint detection CDMA mobile radio system concept developed within Cost 231" (Jung et al.), dated Jul. 25, 1995, University of Kaiserslautern, Germany, pp. 469–473, as mentioned on p. 3 of the specification.

"Benefits of combined TDMA/CDMA operation for third generation mobile radio systems" (Kammerlander), dated Sep. 22, 1996, Siemens Mobile Networks, Munich, Germany, pp. 507–512, as mentioned on p. 3 of the specification.

* cited by examiner

| TCH# | Channel Value | Attenuation in dB |
|---|---|---|
| 1 | I1 | -0.4298 |
| 2 | I2 | -0.2817 |
| 3 | I3 | -0.3551 |
| 4 | I4 | -0.2096 |
| 5 | I5 | 0 |
| 6 | I6 | -0.1386 |
| 7 | I7 | 0 |
| 8 | I8 | -0.3551 |

METHOD AND RADIO STATION FOR DATA TRANSMISSION

CROSS-REFERENCE TO RELATED APPLICATIONS

This is a continuation of copending international application PCT/DE98/02996, filed Oct. 9, 1998, which designated the United States.

BACKGROUND OF THE INVENTION

Field of the Invention

The invention lies in the telecommunications field. More specifically, the invention relates to a method and a radio station for data transmission via a radio interface in a radio communications system. The invention is particularly suited for a mobile radio network.

In radio communications systems, information (for example voice, video information, or other data) is transmitted using electromagnetic waves. The electromagnetic waves are thereby transmitted at carrier frequencies which are in the frequency band intended for the respective system. For GSM (Global System for Mobile Communications), the carrier frequencies lie in the 900 MHz range. For future radio communications systems, for example the UMTS (Universal Mobile Telecommunications System) or other 3rd generation systems, frequencies are provided in the frequency band around 2000 MHz.

The transmitted electromagnetic waves are attenuated by losses due to reflection, refraction, and transmission losses due to the curvature of the earth. This results in a reduction in the reception power which is available at the receiving radio station. This attenuation is position-dependent. In the case of moving radio stations it is time-dependent as well.

Between a transmitting and a receiving radio station, there is a radio interface via which data transmission takes place using electromagnetic waves. In an earlier disclosure (copending application No. 09/495,794; German published application DE 197 33 336) we described a radio communications system which uses CDMA subscriber separation (CDMA=Code Division Multiple Access), with the radio interface also having time-division multiplex subscriber separation (TDMA=Time Division Multiple Access). A JD (Joint Detection) method is used at the receiving end in order to use knowledge of the spread codes of a plurality of subscribers to improve the detection of the transmitted data. It is thereby known that a connection via the radio interface can be assigned at least two data channels, in which case each data channel can be distinguished by means of an individual spread code. Jung P. et al., "A joint detection CDMA mobile radio system concept developed within COST 231", Proceedings of the vehicular technology conference, Chicago, Jul. 25–28, 1995, Vol. 1, No. Conf. 45, pages 469–73, discloses a radio system with a combined TDMA/CDMA radio interface, in which a plurality of signals, which can be separated by means of CDMA codes, are transmitted in one timeslot.

It is known from the GSM mobile radio network for transmitted data to be transmitted as radio blocks (bursts), with midambles with known symbols being transmitted within a burst. These midambles may be used as training sequences in order to tune the radio station at the receiving end. The receiving radio station uses the midambles to estimate the channel impulse responses for various transmission channels.

Bursts having midambles or having one or more data sections which can be distinguished by means of an individual fine structure are added and are digitally and/or analog-filtered before transmission, at the transmission end. Inhomogeneous deformation of the signal sections has been observed, after filtering, during simulations on a demonstrator. At the receiving end, this leads to fluctuations in the reception quality of the data transmission.

SUMMARY OF THE INVENTION

It is accordingly an object of the invention to provide a method and a radio station for data transmission in a radio communications system, which overcomes the above-mentioned disadvantages of the heretofore-known devices and methods of this general type and which further improve data transmission.

With the foregoing and other objects in view there is provided, in accordance with the invention, a method of transmitting data via a radio interface in a radio communications system, which comprises transmitting at least one subscriber signal carrying individual fine structures via a radio interface, the signal containing data symbols in data sections and a midamble with known symbols, and the fine structures of the data sections and of the midamble differ;

summing at a transmission end to produce a sum signal containing signal sections to which different fine structures are applied;

filtering the sum signal in at least one transmission filter and transmitting via a transmission channel to a receiving radio station at a receiving end; and controlling the summing with a control device such that different attenuation of the signal sections is compensated for by the filtering.

In other words, to transmit data via a radio interface in a radio communications system, at least one subscriber signal is transmitted, which has an individual fine structure applied to it and, in addition to data symbols in data sections, contains a midamble with known symbols, wherein the fine structures of the data sections and of the midamble differ. At the transmission end, a sum signal is produced which contains signal sections to which different fine structures are applied. The sum signal is filtered in at least one transmission filter and is transmitted via a transmission channel to a receiving radio station. A control device controls the addition so that different attenuation of the signal sections is compensated for by the filtering.

The invention is based on the knowledge that the deformation is caused by the filtering, with the attenuation levels of the individual signal sections differing considerably (up to 2 dB in an AWGN channel). The fine structures do not all have the same characteristics with regard to the filtering or with regard to the transmission characteristics in specific transmission channels. The fluctuations in the reception quality can be reduced by the measures according to the invention for controlled addition of the signal sections.

In accordance with an added feature of the invention, only one subscriber signal is transmitted from a mobile station to a base station, and the summing step is carried out such that a mean power level of the sum signal of the data sections and of the midamble is approximately the same after filtering. This advantageous development of the invention relates to a mobile station. If only one subscriber signal is transmitted to a base station, then the addition is carried out in such a manner that the mean power level of the sum signal of the data sections and of the midamble is approximately the same after filtering. The signal sections are thus formed by the midamble and the data section, with the fine structures of the two parts differing when spreading is carried out using CDMA codes and thus leading to different attenuation levels. This is undesirable, since transmission power levels which have been set for both signal sections are intended to guarantee adequate reception. The method according to the invention reduces the deformation of the sum signal in the transmitting mobile station itself.

For mobile stations which have to manage with amplifier arrangements that can be produced at low cost, a constant envelope is particularly important, since the dynamic requirements for the amplifier arrangement can be reduced. According to one development of the invention, the sum signal is transmitted as a burst in one timeslot, wherein the mean power level is set in such a manner that the burst has a constant envelope. Different attenuation levels between the data section and midamble are regulated out. The setting of the power ratio between the midamble and the data section is advantageously based on a constant dynamic range. This means that, within a dynamic range which is predetermined for the entire burst, the transmission power of the midamble or of the data section is set in a suitable manner for improved transmission.

At least two subscriber signals are transmitted via the radio interface for mobile stations using a variable data rate or using different transmission services, and for base stations. In accordance with another feature of the invention, the addition of the subscriber signals is carried out in such a manner that different attenuation levels, which can be associated with individual fine structures, in the individual subscriber signals are compensated for. In this case, the signal sections are formed by the different data sections in the subscriber signals, which are likewise deformed differently by the filtering. Appropriate power regulation during the addition results in the power ratios of the subscriber signals at the filter output corresponding to the desired relationships.

In accordance with a further feature of the invention, only one midamble is used for a plurality of connections. Only a portion of the midamble is thus evaluated for each connection at the receiving end. In this case, the transmission power level for the midamble is set for all the connections, rather than on a connection-specific basis. This measure simplifies the implementation of the addition and burst formation.

In accordance with again an added feature of the invention, in order to compensate for the attenuation levels, channel values are stored, which are associated with individual filtering-dependent attenuation levels of spread codes which form the individual fine structure. These channel values are taken into account for controlling the power level of the sum signal. The channel values describe, for example, the relative attenuation of various spread codes in comparison to a midamble. If the filter conditions are constant over time, then, in consequence, the data sections can each have a fixed channel value applied to them for the addition.

The channel values for a group of spread codes that is used are measured and stored in a radio station; alternatively the channel values of the spread codes are transmitted together with the selection of the spread codes, and are then stored in the radio station. The first solution provides advantages if the number of spread codes used is relatively small, while the second solution allows greater flexibility.

The channel values advantageously also include attenuation levels for the transmission channel and/or of reception filters in the receiving radio station. The transmission channel and the reception filters also lead to different distortion to signal sections. Transmission-end compensation for these attenuation levels that are dependent on the fine structure as well additionally improves the transmission quality. One particularly advantageous detection algorithm for the receiving end is a so-called JD detection algorithm. For this algorithm, it is advantageous for the channel values also to take account of the influences of different processing gains. These improvements to the attenuation compensation at the same time make the power regulation between the transmitting and receiving radio stations less sensitive and less susceptible to interference.

In accordance with again an additional feature of the invention, the channel values are calculated in advance for specific radio cell environments. Channel conditions can be described by typical channel models, such as AWGN (additive white gaussian noise), RA (rural area), TU (typical urban), BU (bad urban). Radio cells can be associated with such channel models. The attenuation of individual spread codes can be calculated in advance for these channel models and can be assigned to the radio cells as channel values for further use. If the channel values are calculated using an AWGN channel model, then power regulation results in the spread codes having the same response in indoor and outdoor areas. Wave propagation takes place directly in these radio cell environments. If the optimization is carried out for a TU channel or BU channel, then this provides attenuation compensation for radio cell environments that are subject to severe multipath propagation.

In accordance with again another feature of the invention, the attenuation levels are also compensated for by a group of fine structures being selected for one timeslot for a radio interface with a TDMA component, which group results in approximately the same attenuation ratios in all the subscriber signals. Additional computation complexity for addition and burst formation can be reduced, or even entirely avoided.

With the above and other objects in view there is also provided, in accordance with the invention, a radio station (a base station or a mobile station) for transmitting data via a radio interface in a radio communications system, wherein at least one subscriber signal is transmitted via the radio interface, the subscriber signal having an individual fine structure applied to it and containing data symbols in data sections and a midamble with known symbols, wherein the fine structures of the data sections and of the midamble differ. There are provided:

an addition element for summing signal sections to which different fine structures are applied, to form a sum signal;

at least one transmission filter connected to the addition element for filtering the sum signal; and a control device connected to and controlling the addition element such that different attenuation of the signal sections is compensated for by the filtering of the sum signal.

In accordance with a concomitant feature of the invention, wherein the radio station is a base station of a mobile radio network, including a transmitting device for transmitting at least two subscriber signals via the radio interface, and wherein the addition element is designed such that attenuation levels, which can be associated with the individual fine structures, of individual subscriber signals are compensated for.

Other features which are considered as characteristic for the invention are set forth in the appended claims.

Although the invention is illustrated and described herein as embodied in method and radio station for data transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
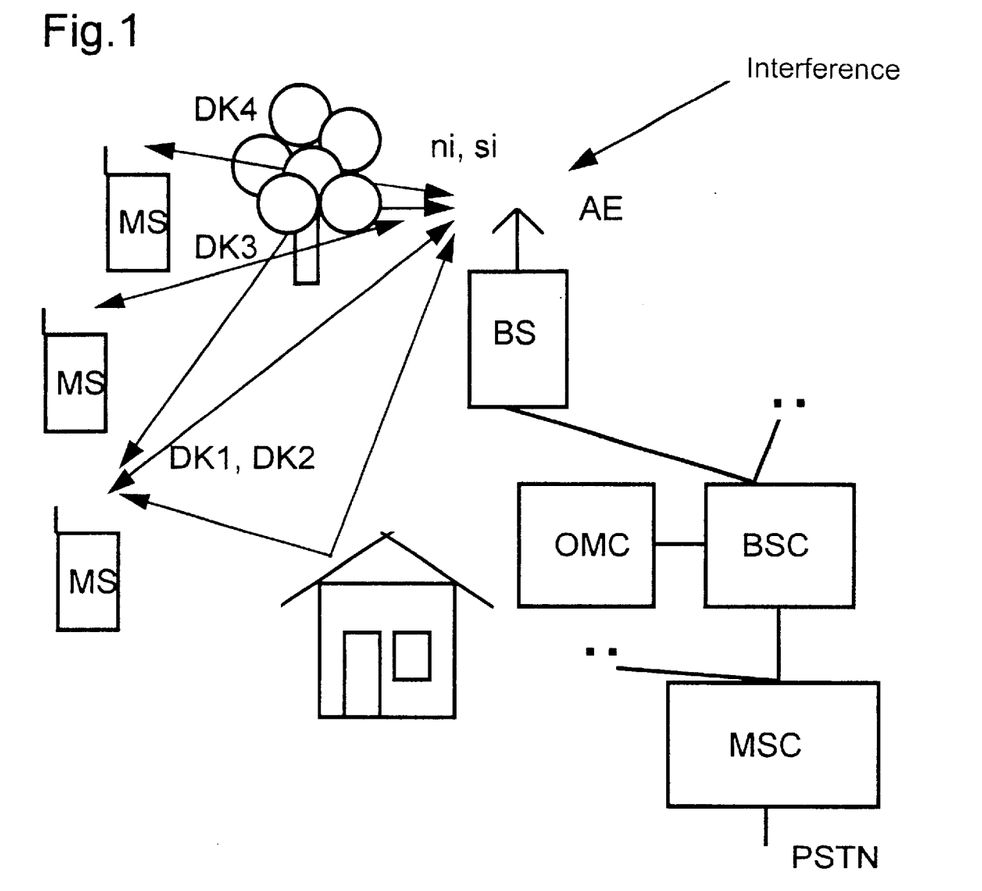
FIG. 1 is a block diagram of a mobile radio network.

Referring now to the figures of the drawing in detail and first, particularly, to FIG. 1 thereof, there is shown a radio communications system that corresponds to the well-known GSM mobile radio network. The network comprises a large number of mobile switching centers MSC which are networked with one another and produce the access to a public switched telephone network PSTN. The mobile switching centers MSC are each connected to at least one base station controller BSC. Each base station controller BSC in turn allows a connection to be set up to at least one base station BS. Such a base station BS is a radio station which can set up a radio link to base stations MS via a radio interface.

By way of example, FIG. 1 shows three radio links for transmission of user information ni and signaling information si between three mobile stations MS and a base station BS, with two data channels DK1 and DK2 being assigned to one mobile station MS, and in each case one data channel DK3 or DK4 being assigned to the other mobile stations MS. Each data channel DK1 . . . DK4 represents a subscriber signal.

An operation and maintenance center OMC provides monitoring and maintenance functions for the mobile radio network, or for parts of it. The functionality of this structure is used by the radio communications system according to the invention; however, it can also be transferred to other radio communications systems in which the invention can be used.

The base station BS is connected to an antenna device which, for example, comprises three individual antenna elements. Each of the individual antenna elements transmits directionally to one sector of the radio cell supplied by the base station BS. However, alternatively, a greater number of individual antenna elements may also be used (as adaptive antennas), so that spatial subscriber separation based on an SDMA (space division multiple access) method can also be used.

The base station BS provides the mobile stations MS with organization information about all the individual antenna elements of the antenna device.

The connections with the user information ni and signaling information si between the base station BS and the mobile stations MS are subject to multipath propagation, which is caused by reflection, for example, on buildings, in addition to the direct propagation path.

Assuming now that the mobile stations MS are mobile stations, then multipath propagation together with further interference leads to the signal components from the various propagation paths for a subscriber signal being superimposed as a function of time in the receiving mobile station MS. Furthermore, it is assumed that the subscriber signals from different base stations BS are superimposed in one frequency channel at the reception point to form a received signal rx. The object of a receiving mobile station MS is to detect data d transmitted in the subscriber signals, relating to user information ni, signaling information si and organization information data.

Figure 2:
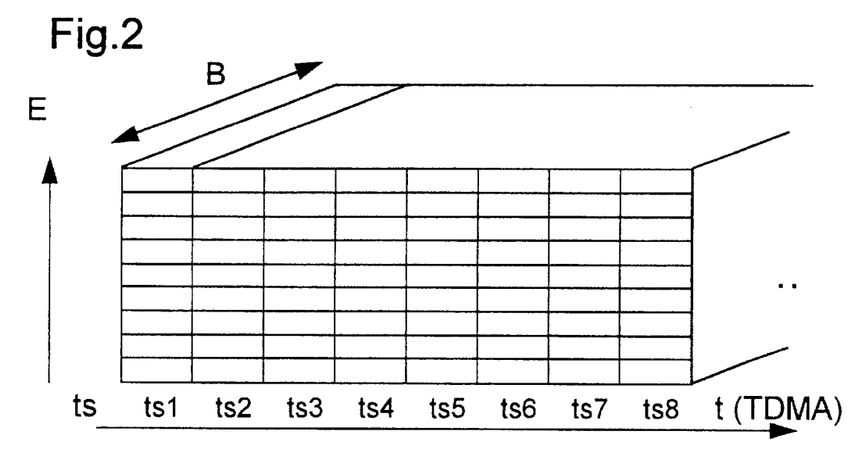
FIG. 2 schematic illustration of the frame structure of the radio interface.

Referring now to FIG. 2, there is shown the frame structure of the radio interface. Based on a TDMA component, it is intended that a broadband frequency band, for example with a bandwidth B=1.6 MHz, is split into a plurality of timeslots ts, for example 8 timeslots ts1 to ts8. Each timeslot ts within the frequency band B forms a frequency channel. Subscriber signals for a plurality of connections are transmitted in bursts within the frequency channels which are intended for user data transmission. Based on an FDMA (Frequency Division Multiple Access) component, a plurality of frequency bands B are assigned to the radio communications system.

Figure 3:
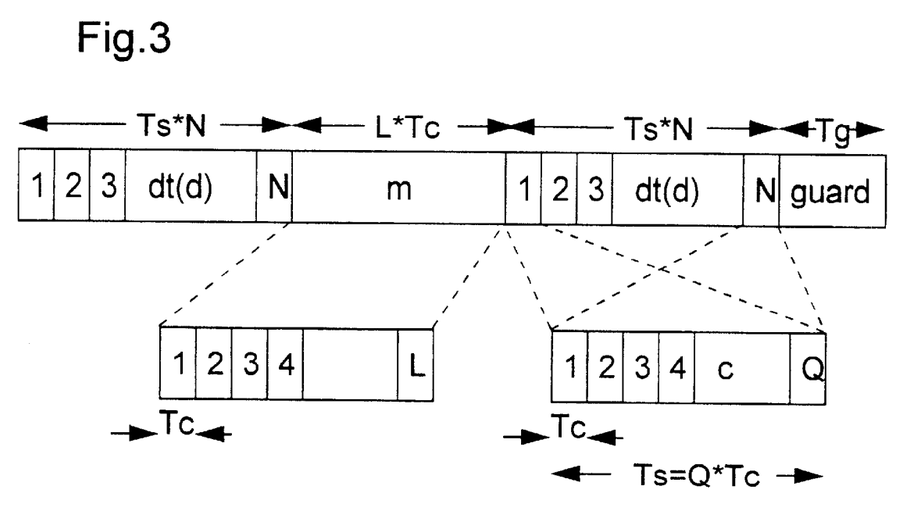
FIG. 3 is a schematic time diagram of the construction of a burst.

With reference to FIG. 3, the bursts for user data transmission comprise data sections dt with data symbols d in which sections with midambles m, which are known at the receiving end, are embedded. The data d are spread on a connection-specific basis with a fine structure, a spread code (CDMA code) so that, at the receiving end, K data channels DK1, DK2, DK3, . . . DKK, for example, can be separated by this CDMA component. A specific energy level E is assigned (power regulation) per symbol to each of these data channels DK1, DK2, DK3, . . . DKK at the transmission end.

The spreading of individual symbols in the data d with Q chips results in Q subsections of duration Tc being transmitted within the symbol duration Ts. The Q chips in this case form the individual spread code. The midamble m comprises L chips, likewise of duration Tc. Furthermore, a guard time guard of duration Tg is provided within the timeslot ts in order to compensate for different signal delay times on the connections in successive timeslots ts.

Within a broadband frequency band B, the successive timeslots are subdivided using a frame structure. Eight timeslots ts are thus combined to form a frame, with one specific timeslot in the frame forming a frequency channel for user data transmission, and being used repetitively by group of subscriber signals. Further frequency channels, for example for frequency or time synchronization of the mobile stations MS, are not inserted in each frame, but at a predetermined time within a multiframe.

The radio interface parameters are, for example, as follows:

| | |
|---|---|
| Duration of a burst | 577 μs |
| Number of chips per midamble m | 243 |
| Guard time Tg | 32 μs |
| Data symbols per data section N | 33 |
| Symbol duration Ts | 6.46 μs |
| Chips per symbol Q | 14 |
| Chip duration Tc | 6/13 μs |

The parameters may also be set differently in the uplink (forward) direction (MS→BS) and the downlink (BS→MS) direction.

Figure 4:
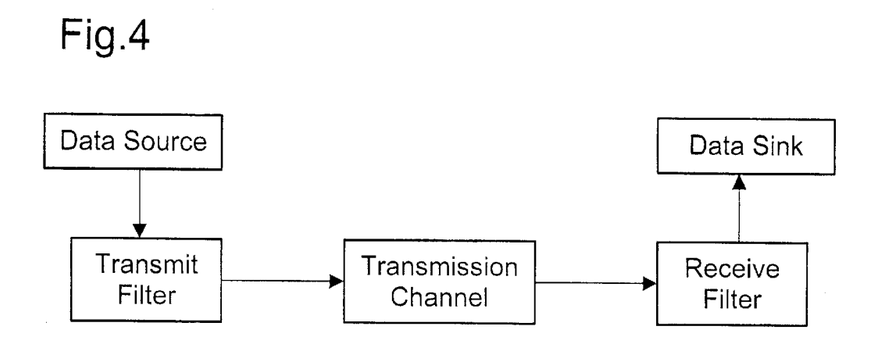
FIG. 4 is a block diagram of the information technology model for data transmission in the radio mobile network.

FIG. 4 shows the information-technology model for transmission of the data. The data are transmitted from a message source to a message sink. All the transmission-end influences from different amplifier stages and filters are detected in the transmission filter. For its part, the reception filter combines all the filter and amplifier functions from analog and digital receiver assemblies. The influences of the transmission filter and of the reception filter are assumed to be constant over time in the following text. If this is not adequate, the channel values, described later, must be updated at intervals for compensation.

Depending on the radio cell environment, the transmission channel in mobile radio networks can be classified as an RA, TU or BU channel, and may have different levels of frequency selectivity. However, averaged statistically, it can be modeled by a constant transfer function (white noise). This leads to the spectral response of the transmission and reception filters remaining unchanged, when averaged statistically. Depending on the frequency selectivity of the radio cell environment, these influences are differently representative of the instantaneous conditions.

Experiments with a demonstrator for a TDMA/CDMA transmission method using JD data detection have shown that the spectral characteristics of CDMA codes lead to the following behavior in this context:

- the individual CDMA codes will experience different attenuation even when the channel conditions at the input to the JD data estimator are the same, and
- the JD data estimation results in a different processing gain for different CDMA codes.

As will be described in the following text, this will be counteracted by power adaptation of the different subscriber signals rather than by code hopping.

Figure 5:
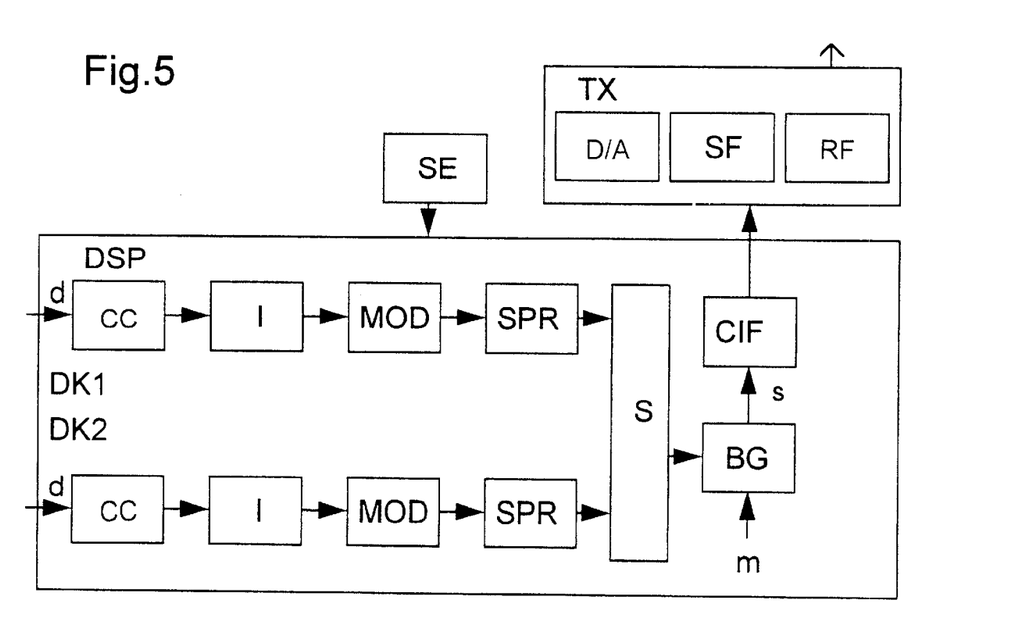
FIG. 5 is a block diagram illustrating the transmitter of a radio station.
Figure 6:
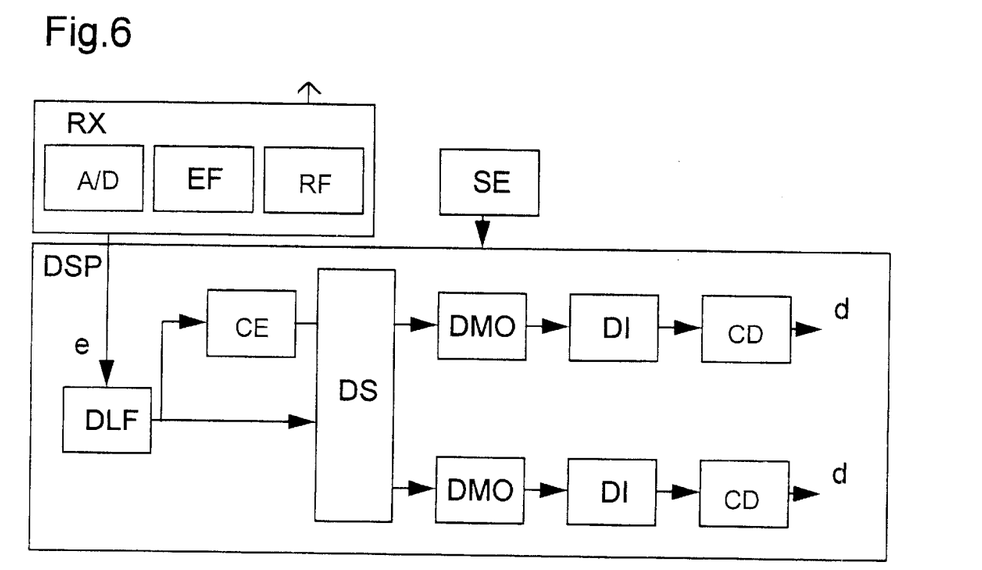
FIG. 6 is a block diagram illustrating the receiver of a radio station.

The transmitters and receivers shown in FIG. 5 and FIG. 6 relate to radio stations which may be not only a base station BS but also a mobile station MS. However, the signal processing for only one connection is illustrated.

The transmitter shown in FIG. 5 receives the previously digitized data symbols d from a data source (microphone or connection to a network), with the two data sections being processed separately, with N=33 data symbols d in each case. First of all, channel coding is carried out at the rate 1/2 and with a constraint length 5 in the convolution coder CC followed by ciphering in the interleaver I with a ciphering depth of 4 or 16.

The cipher data are then 4-PSK modulated in a modulator MOD, are converted into 4-PSK symbols, and are then spread in spreading means SPR in accordance with individual spread codes. This processing is carried out in parallel for all the data channels DK1, DK2 of a connection in a data processing means DSP. The illustration does not show that the other connections are likewise processed in parallel in a base station BS. The data processing means DSP may be implemented in the form of a digital signal processor, which is controlled by a control device SE.

The spread data from the data channels DK1 and DK2 are superimposed in an addition element S, with the data channels DK1 and DK2 being given the same weighting in this superimposition process, and the midamble m being weighted in such a manner that the peak power of the midamble m corresponds to the total peak power of the data sections. The different transmission conditions for the individual connections can be counteracted by appropriately set weighting (power control). The time-discrete representation of the transmitted signal s for the m-th subscriber can be obtained using the following equation:

$$s^{(m)}_{q+(n-1)Q} = \sum_{k=1}^{K(m)} d^{(k,m)}_n c^{(k,m)}_q, \text{ where } q = 1 \cdots Q, \quad n = 1 \cdots N$$

where k(m) is the number of data channels for the $m^{th}$ subscriber and N is the number of data symbols d per data section. The superimposed subscriber signal is supplied to a burst generator BG, which composes the burst taking account of the connection-specific midamble m.

Since complex CDMA codes are used which are derived from binary CDMA codes by multiplication by $j^{q-1}$, the output signal from a chip impulse filter CIF which follows the burst generator BG is GMSK-modulated and has an approximately constant envelope provided the connection uses only one data channel. The chip impulse filter CIF carries out convolution with a GMSK main pulse.

After the digital signal processing, digital/analog conversion is carried out in a digital/analog converter D/A in a transmitting device TX, this is converted to the transmission frequency band with filtering in a transmission filter SF, and the signal is amplified in an high-frequency (RF) section RF. The transmitted signal is then transmitted via the antenna device and reaches the receiving radio station, for example a mobile station MS, via the transmission channel.

An individual midamble m comprising L complex chips is in this case used for each connection. The M different midambles required are derived from a basic midamble code of length M*W, where M is the maximum number of subscribers (connections) and W is the expected maximum number of values for the channel impulse response h. The connection-specific midamble m is derived by rotating the basic midamble code through W*m chips to the right and periodic expansion up to L>(M+1)*W−1 chips. Since the complex basic midamble code is derived from a binary midamble code by modulation with $j^{q-1}$, the transmitted signal for the preamble m is likewise GMSK-modulated.

Figure 8:
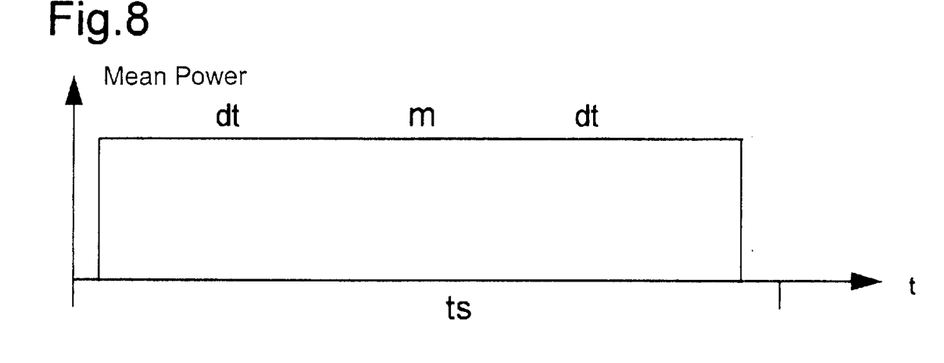
FIG. 8 is a chart showing the power ratios for a burst with one subscriber signal.
Figure 9:
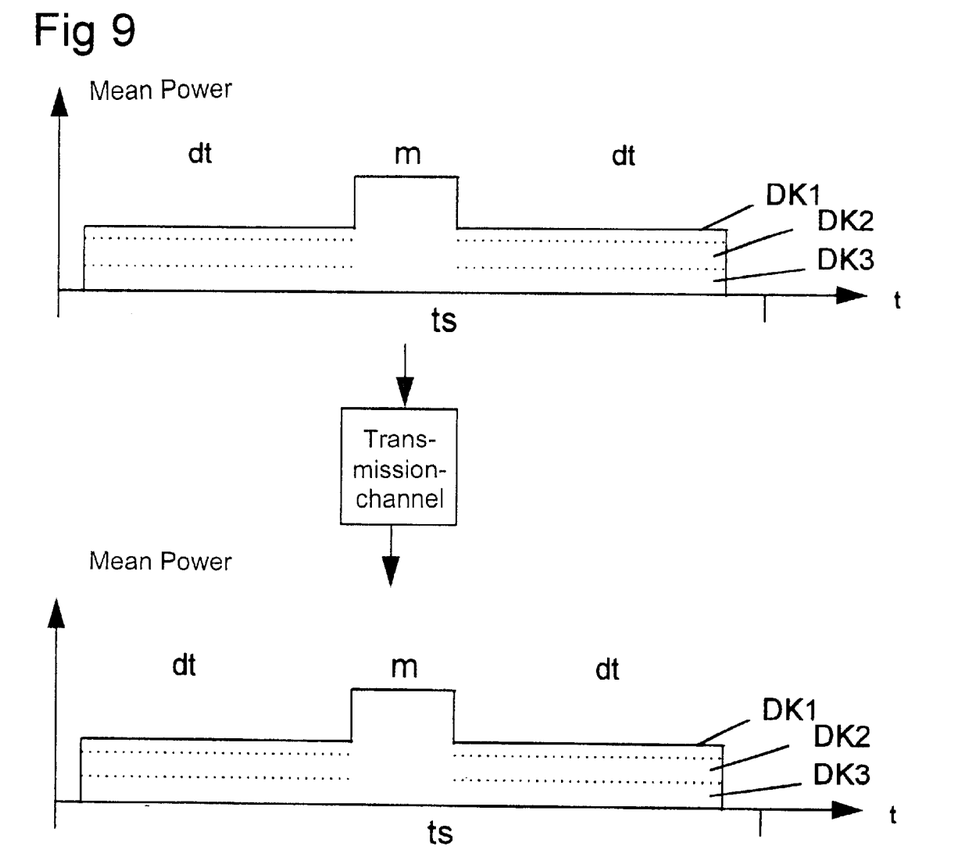
FIG. 9 are two charts showing the power ratios for a burst with three subscriber signals, before and after transmission.

The power ratios in a burst with a subscriber signal, that is to say signal sections comprising a data section dt and a midamble m, are shown in FIG. 8. The summing element or addition element S weights the data symbols d in the data section dt and the midamble m in such a manner that the mean power level in the burst is constant. If there are a number of subscriber signals, the power setting as shown in FIG. 9 is carried out in such a manner that the mean power level of the midamble m is greater than the mean power level of the data sections. A plurality of subscriber signals are transmitted simultaneously in the frequency channel in data channels DK1, DK2, DK3, with each data channel in each case having a constant envelope. The increase in the mean transmission power level for the midamble m is in this case based on the number of data channels DK1, DK2, DK3.

With reference to FIG. 6, at the receiving end, analog processing in a receiving device RX, that is to say amplification in a high-frequency section RF, is followed by filtering in a reception filter EF, conversion to baseband, analog/digital conversion in an analog/digital converter A/D and then digital low-pass filtering of the received signals e in a digital low-pass filter DLF. A part of the received signal e, which is represented by a vector em of length L=M * W and whose data section does not contain any interference, is passed to a channel estimator CE.

The channel estimation of all M channel impulse responses is carried out in accordance with the above-noted copending application Ser. No. 09/495,794 (German application DE 197 34 936), although the channel impulse responses are normalized in accordance with the increase in the power level of the midamble m. The data estimation in the joint detection data estimator CE is carried out jointly for all the subscriber signals. Once the data symbols d in the data channels DK1 and DK2 have been detected, demodulation is carried out in a demodulator DMO, deciphering is carried out in a deinterleaver DI, and channel decoding is carried out in a convolution decoder CD.

The digital signal processing at the transmission end and receiving end is controlled by a control device SE. The control device SE controls, in particular, the number of data channels DK1, DK2 per connection, the spread codes for the data channels DK1, DK2, the present burst structure, the setting of the transmission power levels for the data section dt and midamble m, and the requirements for channel estimation.

Figure 7:
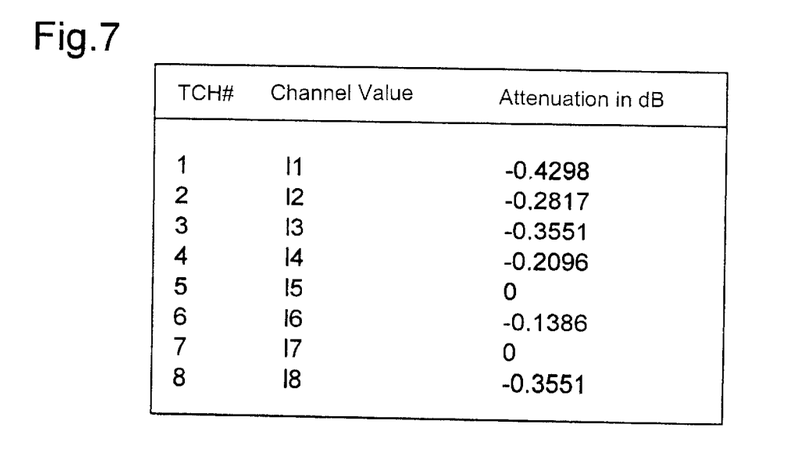
FIG. 7 is a table of channel values stored in the radio station.

In particular, the control device SE influences the superimposition of the data symbols d in the addition element S, taking account of the channel values 11 ... 18 as shown in FIG. 7. The weighting of the data symbols d can thus be set for different data channels DK1, DK2. The control device SE likewise controls the burst generator BG, and thus sets the energy level per symbol. Each spread code denotes a data channel TCH 1 ... 8, which has an associated channel value 11 ... The channel value 11 ... 18 compensates for the individual attenuation discrepancies between the transmission filters SF, CIF, the amplifier arrangements RF and the transmission channel. Optionally, the attenuation level at the receiving end can also be taken into account individually for each spread code. In this case, the attenuation compensation can either be carried out in addition in the receiver, or a version designation for the receiver can be transmitted to the transmitter, so that its attenuation levels are included in the channel values 11 ... 18.

FIG. 8 shows the power ratios within a burst for the mean transmission power for a single mobile station MS. The aim in this case is to utilize the dynamic range which the amplifier arrangements offer within the transmission device TX, while at the same time avoiding any necessity for additional dynamic range between the data sections dt and the midamble m. If the amplifier arrangements have spare dynamic range, then this can be used to increase the transmission power of the midamble m.

FIG. 9 shows that the power ratios of the subscriber signals in the data channels DK1, DK2 and DK3 do not change with respect to one another as a result of the radio transmission, since the finely structured individual attenuation levels are counteracted by appropriate power regulation during the addition process.

The mobile radio network described in the exemplary embodiments and using a combination of FDMA, TDMA and CDMA is suitable for the requirements of 3rd generation systems. In particular, it is suitable for an implementation in existing GSM mobile radio networks, for which only minor modification effort is required.

We claim:

1. A method of transmitting data via a radio interface in a radio communications system, which comprises:

transmitting at least one subscriber signal carrying individual fine structures via a radio interface, the signal containing data symbols in data sections and a midamble with known symbols, and the fine structures of the data sections and of the midamble differ;

summing at a transmission end to produce a sum signal containing signal sections to which different fine structures are applied;

filtering the sum signal in at least one transmission filter and transmitting via a transmission channel to a receiving radio station at a receiving end; and controlling the summing with a control device such that different attenuation of the signal sections is compensated for by the filtering.

2. The method according to claim 1, which comprises transmitting only one subscriber signal from a mobile station to a base station, and carrying out the summing step such that a mean power level of the sum signal of the data sections and of the midamble is approximately the same after filtering.

3. The method according to claim 1, wherein the transmitting step comprises transmitting the sum signal as a burst in one timeslot, and setting a mean power level such that the burst has a constant envelope.

4. The method according to claim 1, which comprises setting the power ratio between the midamble and the data section based on a constant dynamic range.

5. The method according to claim 1, which comprises transmitting at least two subscriber signals via the radio interface, and carrying out the summing of the subscriber signals such that different attenuation levels, which can be associated with the individual fine structures, in the individual subscriber signals are compensated for.

6. The method according to claim 5, which comprises using a common midamble for a plurality of subscriber signals.

7. The method according to claim 5, which comprises transmitting the subscriber signals with a base station to different mobile stations.

8. The method according to claim 1, which comprises storing channel values associated with individual filtering-dependent attenuation levels of spread codes forming the individual fine structure, and taking into account the channel values for controlling the power level of the sum signal.

9. The method according to claim 8, which comprises measuring and storing in a radio station the channel values for a group of spread codes.

10. The method according to claim 8, which comprises transmitting the channel values of the spread codes together with the selection of the spread codes to a radio station, and subsequently storing the channel values in the radio station.

11. The method according to claim 8, wherein the channel values include attenuation levels for at least one of the transmission channel and of the reception filters.

12. The method according to claim 8, which comprises calculating the channel values in advance for specific radio cell environments.

13. The method according to claim 12, wherein the calculating step comprises using a channel model selected from the group consisting of an AWGN channel model, a TU channel model, and a BU channel model.

14. The method according to claim 8, wherein the channel values take into account influences of different processing gains at the receiving end using a JD detection algorithm.

15. The method according to claim 1, wherein the radio interface contains a TDMA component, and a group of fine structures is selected for a timeslot such that the subscriber signals are subject to approximately equal attenuation ratios.

16. In a radio station for transmitting data via a radio interface in a radio communications system, wherein at least one subscriber signal is transmitted via the radio interface, the subscriber signal having an individual fine structure applied to it and containing data symbols in data sections and a midamble with known symbols, wherein the fine structures of the data sections and of the midamble differ, comprising:

an addition element for summing signal sections to which different fine structures are applied, to form a sum signal;

at least one transmission filter connected to said addition element for filtering the sum signal; and     a control device connected to and controlling said addition element such that different attenuation of the signal sections is compensated for by the filtering of the sum signal.

17. The radio station according to claim 16, wherein the radio communications system is a mobile radio network and the radio station is a mobile station.

18. The radio station according to claim 16, wherein the radio communications system is a mobile radio network and the radio station is a base station of the mobile radio network, including a transmitting device for transmitting at least two subscriber signals via the radio interface, and wherein said addition element is designed such that attenuation levels, which can be associated with the individual fine structures, of individual subscriber signals are compensated for.

\* \* \* \* \*